(12) United States Patent
Corrigan (10) Patent No.: US 8,647,690 B2
(45) Date of Patent: Feb. 11, 2014

(54) PROCESS FOR MAKING PET FOOD

(75) Inventor: Patrick Joseph Corrigan, Glendale, OH (US)

(73) Assignee: The Iams Company, Cincinnati, OH (US)

( * ) Notice: Subject to any disclaimer, the term of this patent is extended or adjusted under 35 U.S.C. 154(b) by 140 days.

(21) Appl. No.: 13/349,816

(22) Filed: Jan. 13, 2012

(65) Prior Publication Data

US 2012/0189748 A1 Jul. 26, 2012

Related U.S. Application Data

(60) Provisional application No. 61/434,506, filed on Jan. 20, 2011.

(51) Int. Cl.
*A23P 1/08* (2006.01)
(52) U.S. Cl.
USPC ............................. 426/302; 426/305; 426/510
(58) Field of Classification Search
CPC .......................................................... A23P 1/08
USPC ......................................... 426/302–305, 510
See application file for complete search history.

(56) References Cited

U.S. PATENT DOCUMENTS

| 5,592,748 | A | 1/1997 | Mitzkat et al. |
| 6,274,190 | B1 * | 8/2001 | Long et al. .................... 427/2.15 |
| 7,703,411 | B1 | 4/2010 | Bakos et al. |
| 2008/0283366 | A1 | 11/2008 | Karpinsky et al. |
| 2009/0123616 | A1 | 5/2009 | Karpinsky et al. |
| 2010/0021597 | A1 | 1/2010 | Bakos et al. |
| 2010/0080897 | A1 | 4/2010 | Fiessler |
| 2010/0233756 | A1 | 9/2010 | Sunvold et al. |
| 2010/0303968 | A1 | 12/2010 | Sunvold et al. |

OTHER PUBLICATIONS

PCT International Search Report for PCT/US2012/021212, dated May 9, 2012—5 pages.

* cited by examiner

*Primary Examiner* — Carolyn Paden
(74) *Attorney, Agent, or Firm* — Amy M. Foust (57) ABSTRACT

A process to coat a food product. The process can include providing a food product; providing a vibrating conveyor wherein the vibrating conveyor includes an enclosed channel and wherein the vibrating conveyor has an inlet and an outlet; feeding the food product into the inlet of the vibrating conveyor; operating the vibrating conveyor at a Peclet number of greater than about 6, at a dimensionless acceleration number of greater than about 1, and a vertical amplitude of vibration of greater than about 3 mm; feeding a coating material into the vibrating conveyor such that the food product is coated with the coating material as it moves from the inlet to the outlet.

20 Claims, 2 Drawing Sheets

PROCESS FOR MAKING PET FOOD

CROSS REFERENCE TO RELATED APPLICATIONS

This application claims the benefit of U.S. Provisional Patent Application No. 61/434,506, filed Jan. 20, 2011, which is hereby incorporated by reference in its entirety.

FIELD

The present invention relates to the field of pet food. The present invention more particularly, but not exclusively, relates to a process for making pet food using a vibratory conveyor.

BACKGROUND

Pet food manufacturers continually try to improve dry pet foods to make them more nutritious and taste better. Dry pet foods are typically extruded using heat and pressure to make nutritionally balanced, low moisture pellets (kibbles) that are shelf-stable. Unfortunately, these dry kibbles can often be bland-tasting to the animal, so manufacturers usually coat the kibbles with a fat or a palatant to improve the flavor.

Various techniques have been used to coat low moisture kibbles, including drum coaters, pan coaters, and various types of mixers. While these techniques can be somewhat effective, they often have the disadvantage of applying the coating unevenly to the kibbles. That can be particularly true when the coatings are small percentages by weight of the kibbles. Some of the coating may not even stick to the surface of the kibbles, which can become expensive when these coatings are high value materials such as vitamins, flavorings, or nutraceuticals. Additionally, on a large manufacturing scale, large masses of kibbles moving around inside of coaters and mixers can result in abrasion of the kibbles causing the production of fines and even scraping off the coating that was just applied. To help overcome these problems, however, it has now been found that coating low moisture kibbles in a vibrating conveyor under conditions that ensure particle mixing in the bed can assist in providing better application of the coating among the kibbles and can reduce the losses associated with less efficient coating machinery by providing a gentler method of handling and coating the kibbles.

SUMMARY

A process to coat a food product is disclosed. The process can include providing a food product; providing a vibrating conveyor wherein the vibrating conveyor includes an enclosed channel and wherein the vibrating conveyor has an inlet and an outlet; feeding the food product into the inlet of the vibrating conveyor; operating the vibrating conveyor at a Peclet number of greater than about 6, at a dimensionless acceleration number of greater than about 0.3, and a vertical amplitude of vibration of greater than about 3 mm; feeding a coating material into the vibrating conveyor such that the food product is coated with the coating material as it moves from the inlet to the outlet.

DETAILED DESCRIPTION

Definitions

As used herein, the articles including "the", "a", and "an", when used in a claim or in the specification, are understood to mean one or more of what is claimed or described.

As used herein, the terms "include", "includes", and "including" are meant to be non-limiting.

As used herein, the term "plurality" means more than one.

As used herein, the term "kibble" includes a particulate pellet-like component of animal feeds, such as dog and cat feeds, typically having a moisture, or water, content of less than 12% by weight. Kibbles may range in texture from hard to soft. Kibbles may range in internal structure from expanded to dense. Kibbles may be formed by an extrusion process. In non-limiting examples, a kibble can be formed from a core and a coating to form a kibble that is coated, also called a coated kibble. It should be understood that when the term "kibble" is used, it can refer to an uncoated kibble or a coated kibble. Additionally, as is well known in the art, the size of kibbles can vary. Sizes can range in volume from about 25 $mm^3$ to about 2500 $mm^3$, or from about 100 $mm^3$ to about 2000 $mm^3$, or about 500 $mm^3$. Moreover, the equivalent spherical diameter (or ESD) of an irregularly-shaped object, such as a kibble, can be used to describe kibble sizes. The ESD is the diameter of a sphere of equivalent volume (see Jennings, B. R. and Parslow, K., "Particle Size Measurement: The Equivalent Spherical Diameter", Proceedings of the Royal Society of London, Series A 419, pp. 137-149, 1988). In one embodiment, the range of the ESD of a kibble can be from about 2 mm to about 25 mm, or from about 4 mm to about 18 mm.

As used herein, the terms "animal" or "pet" mean a domestic animal including, but not limited to domestic dogs, cats, horses, cows, ferrets, rabbits, pigs, rats, mice, gerbils, hamsters, horses, and the like. Domestic dogs and cats are particular examples of pets.

As used herein, the terms "animal feed", "animal feed compositions", "animal feed kibble", "pet food", or "pet food composition" all mean a composition intended for ingestion by a pet. Pet foods may include, without limitation, nutritionally balanced compositions suitable for daily feed, such as kibbles, as well as supplements and/or treats, which may or, may not be nutritionally balanced.

As used herein, the term "nutritionally balanced" means that the composition, such as pet food, has known required nutrients to sustain life in proper amounts and proportion based on recommendations of recognized authorities, including governmental agencies, such as, but not limited to, Unites States Food and Drug Administration's Center for Veterinarian Medicine, the Association of American Feed Control Officials Incorporated, in the field of pet nutrition, except for the additional need for water.

As used herein, the terms "Probiotic", "Probiotic component", "Probiotic ingredient", or "Probiotic organism" mean bacteria or other microorganisms, either viable or dead, their constituents such as proteins or carbohydrates, or purified fractions of bacterial ferments, including those in the dormant state and spores, that are capable of promoting mammalian health by preserving and/or promoting the natural microflora in the GI tract and reinforcing the normal controls on aberrant immune responses.

As used herein, the term "core", or "core matrix", means the particulate pellet of a kibble and is typically formed from a core matrix of ingredients and has a moisture, or water, content of less than 12% by weight. The particulate pellet may be coated to form a coating on a core, which may be a coated kibble. The core may be without a coating or may be with a partial coating. In an embodiment without a coating, the particulate pellet may comprise the entire kibble. Cores can comprise farinaceous material, proteinaceous material, and mixtures and combinations thereof. In one embodiment, the core can comprise a core matrix of protein, carbohydrate, and fat.

As used herein, the term "coating" means a partial or complete covering, typically on a core, that covers at least a portion of a surface, for example a surface of a core. In one example, a core may be partially covered with a coating such that only part of the core is covered, and part of the core is not covered and is thus exposed. In another example, the core may be completely covered with a coating such that the entire core is covered and thus not exposed. Therefore, a coating may cover from a negligible amount up to the entire surface. A coating can also be coated onto other coatings such that a layering of coatings can be present. For example, a core can be completely coated with coating A, and coating A can be completely coated with coating B, such that coating A and coating B each form a layer.

As used herein, the term "extrude" means an animal feed that has been processed by, such as by being sent through, an extruder. In one embodiment of extrusion, kibbles are formed by an extrusion processes wherein raw materials, including starch, can be extruded under heat and pressure to gelatinize the starch and to form the pelletized kibble form, which can be a core. Any type of extruder can be used, non-limiting examples of which include single screw extruders and twin-screw extruders.

The list of sources, ingredients, and components as described hereinafter are listed such that combinations and mixtures thereof are also contemplated and within the scope herein.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All lists of items, such as, for example, lists of ingredients, are intended to and should be interpreted as Markush groups. Thus, all lists can be read and interpreted as items "selected from the group consisting of" . . . list of items . . . "and combinations and mixtures thereof."

Referenced herein may be trade names for components including various ingredients utilized in the present disclosure. The invention is not limited by materials under any particular trade name. Equivalent materials (e.g., those obtained from a different source under a different name or reference number) to those referenced by trade name may be substituted and utilized in the descriptions herein.

In the description of the various embodiments of the present disclosure, various embodiments or individual features are disclosed. As will be apparent to the ordinarily skilled practitioner, all combinations of such embodiments and features are possible and can result in preferred executions of the present disclosure. While various embodiments and individual features of the present invention have been illustrated and described, various other changes and modifications can be made without departing from the spirit and scope of the invention. As will also be apparent, all combinations of the embodiments and features taught in the foregoing disclosure are possible and can result in preferred executions of the invention.

Coated Kibble

Various non-limiting embodiments of the present invention include a pet food in the form of a coated kibble wherein the coated kibble includes a core and a coating at least partially covering the core. In one embodiment, the pet food, or coated kibble, can be nutritionally balanced. In one embodiment, the pet food, or coated kibble, can have a moisture, or water, content less than 12%. The kibble can be made and then coated, or late-stage differentiated, with a layering or coating of a dry protein source using a binder, which results in a coated kibble having an increased animal preference. Still other embodiments of the present invention include a method of making a pet food by forming a core mixture and forming a coating mixture and applying the coating mixture to the core mixture to form a coated kibble pet food. Additional embodiments of the present invention include a method of making a pet food including two heat treating salmonella deactivation steps.

One embodiment of the present invention provides a pet food in the form of a coated kibble comprising a core, which can be extruded, a coating coated onto the core, wherein the coating comprises a protein component and a binder component. As disclosed herein, in one embodiment, the coating may only partially surround the core. In one embodiment, the coating can comprise from 0.1% to 75% by weight of the entire coated kibble, and the core can comprise from 25% to 99.9% of the entire coated kibble. In other embodiments, the coating can comprise a range of any integer values between 0.1% and 75% by weight of the coated kibble, and the core can comprise a range of any integer values between 25% and 99.9% by weight of the coated kibble. In additional embodiments, the core can have a moisture, or water, content less than 12% and can comprise a gelatinized starch matrix, which can be formed by way of the extrusion process described herein.

As disclosed, the coated kibble comprises a core and a coating. The core can comprise several ingredients that form a core matrix. In one non-limiting example, the core can comprise a carbohydrate source, a protein source, and/or a fat source. In one embodiment, the core can comprise from 20% to 100% of a carbohydrate source. In one embodiment, the core can comprise from 0% to 80% of a protein source. In one embodiment, the core can comprise from 0% to 15% of a fat source. The core can also comprise other ingredients as well. In one embodiment, the core can comprise from 0% to 80% of other ingredients.

The carbohydrate source, or carbohydrate ingredient, or starch ingredient, can comprise cereals, grains, corn, wheat, rice, oats, corn grits, sorghum, grain sorghum/milo, wheat bran, oat bran, amaranth, Durum, and/or semolina. The protein source, or protein ingredient, can comprise chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, distillers dried grains; and/or distillers dried grains solubles. The fat source, or fat ingredient, can comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

Other ingredients can be included and can comprise active ingredients, such as sources of fiber ingredients, mineral ingredients, vitamin ingredients, polyphenols ingredients, amino acid ingredients, carotenoid ingredients, antioxidant ingredients, fatty acid ingredients, calorie restriction mimetic ingredients, Probiotic ingredients, prebiotic ingredients, and still other ingredients. Sources of fiber ingredients can include fructooligosaccharides (FOS), beet pulp, mannanoligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), cellulose, α-cellulose, galactooligosaccharides, xylooligosaccharides, and oligo derivatives from starch, inulin, psyllium, pectins, citrus pectin, guar gum, xanthan gum, alginates, gum arabic, gum talha, beta-glucans, chitins, lignin, celluloses, non-starch polysaccharides, carrageenan, reduced starch, soy oligosaccharides, trehalose, raffinose, stachyose, lactulose, polydextrose, oligodextran, gentiolioligosaccharide, pectic oligosaccharide, and/or hemicellulose. Sources of mineral ingredients can include sodium selenite, monosodium phosphate, calcium carbonate, potassium chloride, ferrous sulfate, zinc oxide, manganese sulfate, copper sulfate, manganous oxide, potassium iodide, and/or cobalt carbonate. Sources of vitamin ingredients can include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and/or ascorbic acid. Sources of polyphenols ingredients can include tea extract, rosemary extract, rosemarinic acid, coffee extract, caffeic acid, turmeric extract, blueberry extract, grape extract, grapeseed extract, and/or soy extract. Sources of amino acid ingredients can include 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, and/or Serine. Sources of carotenoid ingredients can include lutein, astaxanthin, zeaxanthin, bixin, lycopene, and/or beta-carotene. Sources of antioxidant ingredients can include tocopherols (vitamin E), vitamin C, vitamin A, plant-derived materials, carotenoids (described above), selenium, and/or CoQ10 (Co-enzyme Q10). Sources of fatty acid ingredients can include arachidonic acid, alpha-linoleic acid, gamma linolenic acid, linoleic acid, eicosapentanoic acid (EPA), docosahexanoic acid (DHA), and/or fish oils as a source of EPA and/or DHA. Sources of calorie restriction mimetic ingredients can include glucose anti-metabolites including 2-deoxy-D-glucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, avocado extract comprising mannoheptulose, and/or avocado flesh comprising mannoheptulose. Still other ingredients can include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), anti-foaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solublizing agents, suspending agents (non-surfactant), solvents, viscosity increasing agents (aqueous and non-aqueous), sequestrants, and/or keratolytics.

The Probiotic ingredient or component can comprise one or more bacterial probiotic microorganism suitable for pet consumption and effective for improving the microbial balance in the pet gastrointestinal tract or for other benefits, such as disease or condition relief or prophylaxis, to the pet. Various Probiotic microorganisms are known in the art. See, for example, WO 03/075676, and U.S. Published Application No. US 2006/0228448A1. In specific embodiments, the probiotic component may be selected from bacteria, yeast or microorganism of the genera *Bacillus, Bacteroides, Bifidobacterium, Enterococcus* (e.g., *Enterococcus faecium* DSM 10663 and *Enterococcus faecium* SF68), *Lactobacillus, Leuconostroc, Saccharomyces, Candida, Streptococcus*, and mixtures of any thereof. In other embodiments, the probiotic may be selected from the genera *Bifidobacterium, Lactobacillus*, and combinations thereof. Those of the genera Bacillus may form spores. In other embodiments, the probiotic does not form a spore. Non-limiting examples of lactic acid bacteria suitable for use herein include strains of *Streptococcus lactis, Streptococcus cremoris, Streptococcus diacetylactis, Streptococcus thermophilus, Lactobacillus bulgaricus, Lactobacillus acidophilus* (e.g., *Lactobacillus acidophilus* strain DSM 13241), *Lactobacillus helveticus, Lactobacillus bifidus, Lactobacillus casei, Lactobacillus lactis, Lactobacillus plantarum, Lactobacillus rhamnosus, Lactobacillus delbrukii, Lactobacillus thermophilus, Lactobacillus fermentii, Lactobacillus salvarius, Lactobacillus reuteri, Bifidobacterium longum, Bifidobacterium infantis, Bifidobacterium bifidum, Bifidobacterium animalis, Bifidobacterium pseudolongum*, and *Pediococcus cerevisiae*, or mixtures of any thereof. In specific embodiments, the probiotic-enriched coating may comprise the bacterial strain *Bifidobacterium animalis* AHC7 NCIMB 41199. Other embodiments of the Probiotic ingredient may include one or more microorganisms identified in U.S. Published Application Nos. US 2005/0152884A1, US 2005/0158294A1, US 2005/0158293A1, US 200510175598A1, US 2006/0269534A1 and US 2006/0270020A1 and in PCT International Publication No. WO 2005/060707A2.

In at least one embodiment, a coating can be coated onto the core, described hereinabove. Thus, the uncoated core can be late-stage differentiated by applying a coating, which can increase the animal preference and thus the pet acceptance or preference for the final coated kibble. In one embodiment, this uncoated core can be a core that has been already processed, including milling, conditioning, drying, and/or extruded, all as described herein.

The coating can comprise several coating components, or agents, that form a coating to coat the core of the kibble. In one non-limiting example, the coating can comprise a protein component and a binder component. In one embodiment, the coating can comprise from 50% to 99% of a protein component and from 1% to 50% of a binder component. The coating can also comprise other components as well, which can be applied with the protein component and/or binder component, or can be applied after application of the protein and/or binder component. In one embodiment, the coating can comprise from 0% to 70% of a palatant component. In one embodiment, the coating can comprise from 0% to 50% of a fat component. In one embodiment, the coating can comprise from 0% to 50% of other components.

In one embodiment, the coated kibble can have more than one coating. Thus, a first coating, second coating, third coating, and so on can be included. Each of these coatings can be comprised of any of the coating components as described herein.

In any of the embodiments described herein, the coating components can be considered a solids coating, solids component, or solids ingredient. Thus, this solids coating can comprise less than 12% moisture, or water, content. In one embodiment, the coating component comprises a protein component as a solids coating having less than 12% moisture, or water, content.

The coating as described herein can be a partial or complete covering on the surface of the core. In one example, a core may be partially covered with a coating such that only part of the core is covered, and part of the core is not covered and is thus exposed. In another example, the core may be completely covered with a coating such that the entire core is covered and thus not exposed. A coating can also be coated onto other coatings such that a layering of coatings can be present. For example, a core can be completed coated with a first coating component, and the first coating component can be completely coated with a second coating component such that the first coating component and the second coating component each form a separate layer. Of course, additional coating components can be added, such as third, fourth, fifth, sixth, up to the desired number of coating components. In one embodiment, each can form a separate layer. In another embodiment, each can form partial layers. In one embodiment, a plurality of coating components can form a single layer, and each additional layer can be formed from one or a plurality of coating components.

The protein component can comprise chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, distillers dried grains, distillers dried grains solubles, and single-cell proteins, for example yeast, algae, and/or bacteria cultures. One embodiment of a protein component comprises chicken by-product meal at less than 12% moisture, or water.

The binder component can comprise any of the following or combinations of the following materials: monosaccharides such as glucose, fructose, mannose, arabinose; di- and trisaccharides such as sucrose, lactose, maltose, trehalose, lactulose; corn and rice syrup solids; dextrins such a corn, wheat, rice and tapioca dextrins; maltodextrins; starches such as rice, wheat, corn, potato, tapioca starches, or these starches modified by chemical modification; oligosaccharides such as fructooligosccharides, alginates, chitosans; gums such as carrageen, and gum arabic; polyols such as glycerol, sorbitol, mannitol, xylitol, erythritol; esters of polyols such as sucrose esters, polyglycol esters, glycerol esters, polyglycerol esters, sorbitan esters; sorbitol; molasses; honey; gelatins; peptides; proteins and modified proteins such as whey liquid, whey powder, whey concentrate, whey isolate, whey protein isolate, high lactose whey by-product, such as DAIRYLAC® 80 from International Ingredient Corporation, meat broth solids such as chicken broth, chicken broth solids, soy protein, and egg white. These aforementioned binder components can be used in combination with water, especially when added. The binder material can be dissolved or dispersed in water, forming a liquid mixture or solution, which can then be applied over the surface of the core. The liquid mixture can facilitate both even dispersion of the binder component over the core surface and the interaction between the core surface and the protein component being applied to the surface of the core. In one embodiment, the liquid mixture can be an about 20% liquid mixture of binder component, which can be added to the kibble at 5% to 10% by weight of the kibble, which, on a dry matter basis, becomes about 1% to 2% by weight of the kibble.

In embodiments when a binder component is used, keeping the binder component on the surface of the core can be done, thus preventing, or at least attempting to minimize, absorption of the binder towards and into the core. In one embodiment, additives can be added to increase the viscosity of the binder solution. Those additives can be corn starch, potato starch, flour, and combinations and mixtures thereof. These additives can assist in keeping the binder component on the surface of the kibble to prevent or minimize absorption from the surface towards and into the core. In another embodiment, varying the temperature of the binder solution to thicken the solution can be done. For example, when using egg white as a binder component, denaturization of the proteins of the egg whites can create a gel-like solution. This formation of a gel-like solution can occur around 80° C., so in one embodiment raising the temperature of the binder solution to 80° C. can be performed. Additionally, the temperature of the core can be increased to also assist in minimizing the absorption of the binder towards the core. In another embodiment, additives and temperature variation as just described can also be done in combination.

Thus, in one embodiment, the binder component can act as a glue, or adhesive material, for the protein component to adhere to the core. In one embodiment, the protein component can be a solids ingredient at less than 12% moisture content, and the binder component can be a liquid. In one embodiment, the binder component can be applied to or layered onto the core to act as the glue for the protein component, which can then be applied to or layered onto the core with binder component. In another embodiment, the protein component as a solids ingredient can be mixed with the binder component, and then the mixture can by applied to or layered onto the core.

In one embodiment, lipids and lipid derivatives can also be used as binder components. Lipids can be used in combination with water and/or other binder components. Lipids can include plant fats such as soybean oil, corn oil, rapeseed oil, olive oil, safflower oil, palm oil, coconut oil, palm kernel oil, and partially and fully hydrogenated derivatives thereof; animal fats and partially and fully hydrogenated derivatives thereof; and waxes.

In one embodiment, it can be advantageous to minimize the interfacial tension between the coating and the kibble. Emulsifiers can be used in one embodiment to minimize such repulsive forces. The emulsifier can comprise an emulsifier comprising a plurality of hydroxyl groups. In other embodiments, emulsifiers such as mono- and diglycerides of fatty acids, mono- and diacetyl tartaric acid esters of mono- and diglycerides of fatty acids, sodium and calcium stearoyl-2-lactylates, mono- and diacetyl tartaric acid esters of monoand diglycerides of fatty acids and sucrose esters of fatty acids, citric acid esters of mono- and diglycerides of fatty acids, lactic acid esters of mono- and diglycerides of fatty acids and polyglycerol esters, lecithins, polyglycerol esters and polysorbate esters can be mixed with the coating, forming an emulsifier and coating composition. Such emulsifier can be used to minimize the surface energy and interfacial tension between the coating and the kibble surface. Minimization of the surface energy of the coating has been associated with better adherence of the coating to the kibble by lowering the interfacial tension. Coatings can be any of the coatings as disclosed herein. Particular emulsifiers can include polysorbate esters such as Polysorbate 80. In one embodiment, the emulsifier can be used at from about 0.01% to about 10% by weight of the coating and emulsifier composition. Thus, the coating can be from about 90% to about 99.99% by weight of the coating and emulsifier composition. In other embodiments, the emulsifier can be present at from about 0.1% to about 2%, or from about 0.1% to about 1%, or from about 0.5% to about 1%, by weight. Accordingly, the coating can be from about 98% to about 99.9%, or from about 99% to about 99.9, or from about 99% to about 99.5%, by weight.

The surface energy is understood to mean the average surface energy of a representative area of a compressed powder, although localized variations may occur due to such factors as variation in mixing or grinding and texture. The surface energy of the compressed powder correlates to hydrophobicity and hydrophilicity, and may be representative of, for example, the moisture content of the powder. The surface energy of the compressed pellet is derived from contact angle measurements of liquids of known surface tension, which can be converted to surface energy by various accepted models that would be known to one of skill in the art. One such model, used in the present invention, is the Fowkes equation, as described in Fowkes, F. M.: *Industrial and Engineering Chemistry*, vol. 56, number 12, p. 40 (1964):

$$\gamma_{lv}(1+\cos\theta)=2(\gamma_{lv}^{d}\gamma_{sv}^{d})^{1/2}+2(\gamma_{lv}^{p}\gamma_{sv}^{p})^{1/2}$$

where $\theta$ refers to the contact angle; $\gamma_{lv}$ refers to the surface tension of the liquid (solvent of known surface tension); $\gamma_{lv}^{d}$ refers to the dispersive component of the surface tension of the liquid; $\gamma_{sv}^{d}$ refers to the dispersive component of the surface tension of the solid (compressed pellet); $\gamma_{lv}^{p}$ refers to the polar component of the surface tension of the liquid and $\gamma_{sv}^{p}$ refers to the polar component of the surface tension of the solid. The contact angles of the compressed pellet herein were measured using diiodomethane (99%, Aldrich), formamide (99%+, Aldrich) and water (HPLC grade, Aldrich). The total surface energy of the compressed pellet is the sum of the dispersive surface energy component and the polar surface energy component, which is thought to affect properties such as adhesion of substances to the kibble.

A palatant component can be used in some embodiments. The palatant can comprise chicken flavor, such as liquid digest derived from chicken livers, which can be approximately 70% water and chicken liver digests. A palatant component as used herein means anything that is added to the animal feed for the primary purpose of improving food acceptance, or preference, by the animal. A palatant component, which can also be considered a flavor, a flavoring agent, or a flavoring component, can include a liver or viscera digest, which can be combined with an acid, such as a pyrophosphate. Non-limiting examples of pyrophosphates include, but are not limited to, disodium pyrophosphate, tetrasodium pyrophosphate, trisodium polyphosphates, tripolyphosphates, and zinc pyrophosphate. The palatant component can contain additional palatant aids, non-limiting examples of which can include methionine and choline. Other palatant aids can include aromatic agents or other entities that drive interest by the animal in the food and can include cyclohexanecarboxylic acid, peptides, monoglycerides, short-chain fatty acids, acetic acid, propionic acid, butyric acid, 3-methylbutyrate, zeolite, poultry hydrolysate, tarragon essential oil, oregano essential oil, 2-methylfuran, 2-methylpyrrole, 2-methyl-thiophene, dimethyl disulfide, dimethyl sulfide, sulfurol, algae meal, catnip, 2-Piperidione, 2,3 pentanedione, 2-ethyl-3,5-dimethypyrazine, Furfural, Sulfurol, and Indole. In addition, various meat based flavorants or aroma agents can be used, non-limiting examples include meat, beef, chicken, turkey, fish, cheese, or other animal based flavor agents.

A fat component can be used in some embodiments. The fat component can comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

The other components can comprise active ingredients as disclosed herein above. The Probiotic ingredient or component can comprise one or more bacterial Probiotic microorganisms as described herein above.

These active ingredients can be provided in any form, such as in a dry form. A dry form of an active can be a form that comprises less than 12% moisture, or water, and thus can be considered a solids ingredient. Thus, in one embodiment, a Probiotic component can be provided in a dry form as a powder, such as with an average particle size of less than 100 micrometers. At less than 100 micrometers, the Probiotic component can be adhered more easily to the kibble. In one embodiment, Probiotic components can have a particle size greater than 100 micrometers. However, in this embodiment, more binder can be used to aid in adherence of the Probiotic to the kibble. The Probiotic component in the form of a dry powder can be applied as part of the coating to the core, resulting in a coated kibble having a Probiotic in the coating.

Thus, the coating can comprise active ingredients. Therefore, one embodiment of the present invention relates to a method of delivering active ingredients to a pet or animal, wherein the active ingredients can comprise any of the active ingredients disclosed herein, including mixtures and combinations thereof. In one embodiment, a pet food in the form of a coated kibble is provided. The coated kibble can comprise a core as described herein, and the coated kibble can comprise a coating as disclosed herein. In one embodiment, the coating comprises coating components, comprising a protein component as disclosed herein, a binder component as described herein, a fat component as described herein, a palatant component as described herein, and active ingredients as described herein. In one embodiment, the protein component, the fat component, and the palatant component, and combinations and mixtures thereof, can act as a carrier for the active ingredient. In another embodiment, the active ingredients can be a solids ingredient, such that the moisture, or water, content is less than 12%. The pet food in the form of a coated kibble, comprising active ingredients, can be provided to a pet or animal for consumptions. The active ingredient can comprise from 0.01% to 50% of the coating.

In one embodiment of the present invention, the protein component of the coating can be a dry component, or a solids ingredient, such that the water content of the protein component is less than 12%. Therefore, in this embodiment, the protein component, or solids ingredient, can act as a solid-like material that can be coated onto a core by using a binder ingredient. A protein component having less than 12% moisture, or water, can be extremely difficult to coat onto a core, or kibble, which itself can have a low moisture, or water, content, even less than 12%, as described herein. Thus, a binder component can assist in the coating of the dry protein component onto the core, or kibble.

In one embodiment, the finished coated kibble can comprise from 80% to 90% core and from 10% to 20% coating. The core can comprise from 45% to 55% carbohydrate source, from 35% to 45% protein source, from 0.1% to 5% fat source, and from 5% to 10% other ingredients. The coating can comprise from 65% to 75% protein component, a non-limiting of which can be chicken by-product meal, from 5% to 10% binder component, a non-limiting example of which can be egg white, high lactose whey by-product, whey protein isolate or chicken broth, from 15% to 25% fat component, a non-limiting example of which can be chicken fat, and from 1% to 10% palatant component, a non-limiting example of which can be chicken liver digest. The coated kibble can comprise less than 12% water.

Process

The kibble embodiments of the present invention may be formed by an extrusion process and then processed in a vibrating conveyor, as described herein. A vibrating conveyor may be linear or planar, but more often is presented as a spiral elevator or vibrating helix. A vibrating conveyor is conventionally used to move particles upward, as from a truck to a silo. Particles are moved along the conveyor by vibration. The conveyor is typically configured to maximize horizontal movement, and the conveyor itself is configured to move particles in the vertical direction. For example, the conveyor may be spiral, such that "horizontal" movement along the conveyor also moves the particles vertically over the length of the conveyor. In such a configuration, the conveyor and the vibration of the conveyor are configured to minimize vertical movement of the particles relative to the conveyor surface, because such vertical movement is not productive with regard to advancing particles along the conveyor. Thus, regardless of the depth of the conveyor bed, there is little turnover of particles in the vertical or z-direction as they move along the vibrating conveyor. Particles which start at the bottom of the bed tend to reside at or near the bottom of the bed at the end of the conveyor, and particles which start at the top of the bed tend to reside at or near the top of the bed at the end of the conveyor.

In contrast, by changing the vertical amplitude of the vibration, dimensionless acceleration, plug flow (as measured by Peclet number, described below), and/or other parameters, it is possible to tune the vibration of a vibrating conveyor to get regular z-direction or vertical exchange of particles moving horizontally along the vibrating conveyor. Combined with one or more coating locations along the path of the vibrating conveyor, this z-direction movement can be used to coat particles in a continuous process. By tuning the vibration, more or less uniform coatings may be applied all around the particles. That is, because the particles are moving in the z-direction, a coating may be spread to most or all of the surface of the particles without batch mixing, as in a paddle mixer. Further, because the particles change position relative to one another in the z-direction, it is possible to coat multiple surfaces of multiple layers of particles, unlike in conventional spray coating, which coats one side or one surface of a single layer of particles.

Thus, by reconfiguring the vibrating conveyor to achieve the desired level of z-direction movement and particle exchange, it may be possible to achieve more regular, even coating of a larger number of particles than is possible using a conventional coating apparatus of comparable size and mass flow. In some embodiments, the more even coating application may provide advantages in the coated product. For example, coatings used to retain moisture may be more effective if they are uniformly applied to most or all of the surface of a particle. Active coatings may be more evenly dosed, so that the amount of, for example, vitamins, minerals, or probiotics delivered in a coating is more predictable per volume of kibble. If multiple coating dispensers are used along the path of the vibrating conveyor, it is possible to get multiple layers of predictable, uniform coatings over most or all of the surface area of a particle.

As described herein, the particles are kibbles, however, it should be understood that the process and apparatus for coating using a vibrating conveyor are adaptable to coating many kinds of particulates or pellets with many kinds of coatings. Even particulates which are relatively sensitive to vibration may be processed in this manner. With particularly delicate, brittle, or inchoate particles, the depth of the bed and/or the amplitude of the horizontal and vertical vibration may be adapted to provide gentler handling. Further, by varying the type, number, and placement of coating dispensers along the vibrating conveyor, it is possible to provide thick coatings (as by applying more of the same coating at different points along the conveyor) and/or complex coatings (for example, layers of different coatings in different volumes, weights, or thicknesses).

The kibble embodiments of the present invention may be formed by an extrusion process whereby the core ingredients are extruded under heat and pressure to form a pelletized kibble form, or core pellet. During the extrusion process, if a starch matrix is employed, it may and typically does become gelatinized under the extrusion conditions.

In one embodiment, the extruding of the core matrix may be done using a single screw extruder, while other embodiments may be done using a twin-screw extruder. Extrusion of the core matrix may require specific configurations of the extruder to produce a material suitable for a kibble pet food. For example, very high shears and low extrusion times may be necessary to prevent significant color degradation and prevent polymerization of the material within the extruder and to produce kibbles that are durable for further processing, such as coating with one or more coatings.

Processes common to making dry pet foods are milling, batching, conditioning, extrusion, drying, and coating. Milling encompasses any process used to reduce whole or partial ingredients into smaller forms. Whole or partial formulations are created in the process step for batching by mixing dry and/or liquid ingredients. Often these ingredients are not in the most nutritious or digestible form and thus processes are needed to further convert these ingredients to a digestible form via some sort of cooking process.

During the milling process, the individual starting components of the core material can be mixed and blended together in the desired proportions to form the core material. In one embodiment, the resulting core material may be screened to remove any large agglomerate of material therefrom. Any sort of conventional solids mixer can be used for this step including, but not limited to, plough mixers, paddle mixers, fluidizing mixers, conical mixers, and drum mixers. One skilled in the art of solids mixing would be able to optimize the mixing conditions based on the types of materials, particle sizes, and scale, from any one of a number of widely available textbooks and articles on the subject of solids mixing.

The core material mixture can then be fed into a conditioner. Conditioning may be used to pretreat the ingredients and can include hydration, addition/mixing of other ingredients, and partial cooking. Cooking can often be accomplished by the addition of heat in the form of steam and can result in discharge temperatures of from 113° F. to 212° F. Pressurized conditioning may be used when temperatures need to be elevated above standard atmospheric conditions, such as at greater than 212° F. Conditioned ingredients and/or ingredients, or combinations thereof, can then be transferred to an extruder for further processing.

The core material, such conditioned, can then be subjected to an extrusion operation in order to obtain an expanded core pellet. In one embodiment, the core material may be routed to a hopper prior to the extrusion operation. The extruder may be any suitable single or twin screw cooking extruder. Suitable extruders may be obtained from Wenger Manufacturing Inc., Clextral S A, Buhler A G, and the like. The extruder operating conditions may vary depending on the particular product to be made. For example, the texture, hardness, or bulk density of the extruded product may be varied using changes in the extruder operating parameters. Similar to conditioning, extrusion can be used to incorporate other ingredients (non-limiting examples of which are carbohydrates, proteins, fats, vitamins, minerals, and preservatives) by having dry and/or liquid ingredient streams added anywhere along the length of the extruder feed port, barrel, or die. Extruders are often, but not limited to, single- or twin-screw in design and operate up to 1700 rpm. The extrusion process can often be accompanied with high pressure (up to 1500 psig) and high temperature (up to 250° C.). Extrusion can be used to accomplish the making of continuous ropes or sheets but also discrete shapes and sizes of edible food. These forms, shapes, and sizes are often the result of forcing the materials through a die or set of die openings and cutting or breaking into smaller segments.

At this stage, the extruded product can be in any form, such as extruded ropes, sheets, shapes, or other segments, and can be in an expanded moist pellet form that can then be transferred to post-extrusion operations. These can include crimping, shredding, stamping, conveying, drying, cooling, and/or coating in any combination or multiple of process flow. Crimping is any process that pinches food together. Shredding is any process that reduces the size of the food upon extrusion, preferably by tearing. Stamping is any process that embosses a surface or cuts through a food. Conveying is used to transport food from one operation to another and may change or maintain the state of the food during transport; often this process is mechanical or pneumatic. Drying can be used to reduce process moisture, or water, to levels suitable for shelf-life in the finished product. If as an expanded moist pellet, such as a kibble, the pellets can be transported from the extruder outlet to a dryer, such as a dryer oven, by a conveying, airveying, or auguring system. After expansion and transport to the entrance to the dryer, the kibbles typically have been cooled to between 85° C. and 95° C. and kibble moisture, or water, reduce by evaporation from about 25-35% to about 20-28%. The temperature of the drying oven may be from 90° C. to 150° C. The temperature of the core pellets exiting the drying oven may be from 90° C. to 99° C.

The product may be optionally cooled at this point. The product may be cooled using a conventional solids cooler such as coolers made by Geelen® or Aeroglide®. The product may be cooled to between 20° C. to 89° C.

Figure 1:
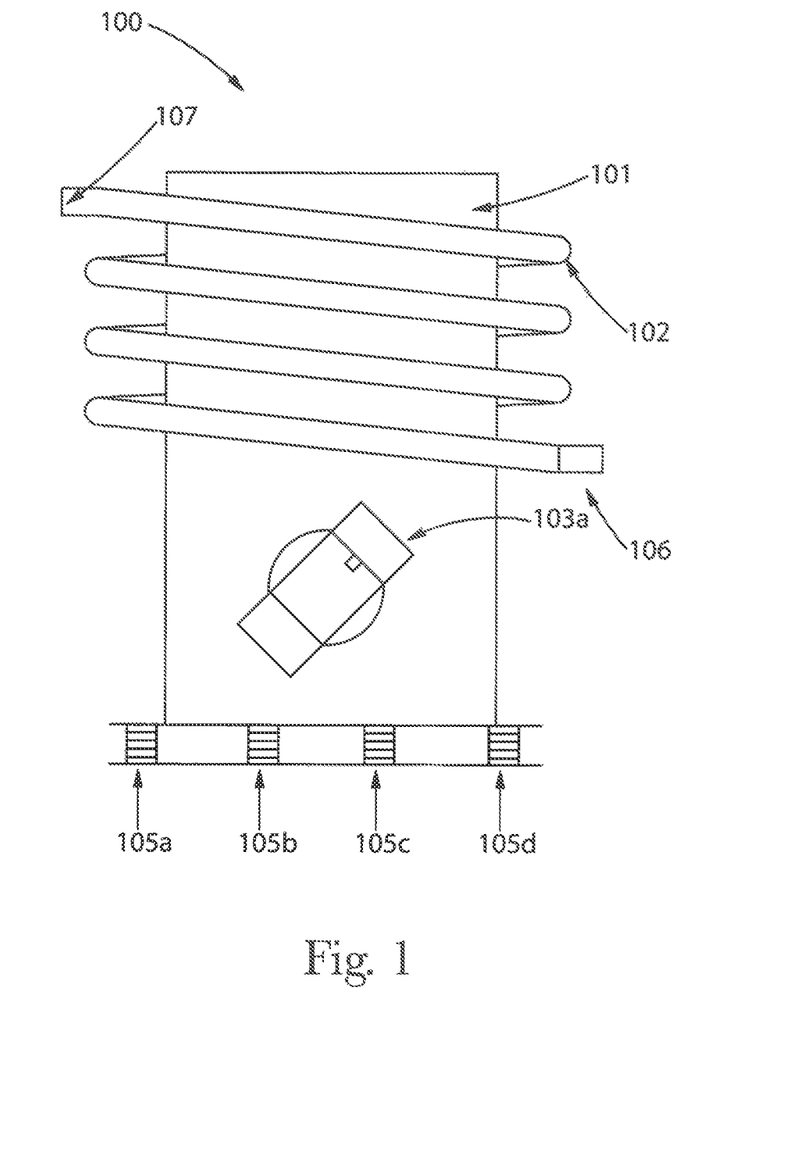
FIG. 1 is a side view of one embodiment of a spiral conveyor.

Thus, at this stage, the core pellets, or core, can be considered cooked such that any starch component that was used can be gelatinized. In one embodiment, the core pellets can then be further processed in a vibrating conveyor. FIG. 1 shows just one embodiment of a vibrating conveyor in the form of a spiral elevator. Vibrating conveyors are known in the art. One embodiment of a vibrating conveyor is shown in U.S. Pat. No. 5,592,748, assigned to Eurecat, France.

For a vibrating conveyor as disclosed herein, process parameters can be controlled and thus varied. These process parameters, as described hereinafter, can include level of fill of the vibrating bed, flow rate through the vibrating bed, vibration amplitude, vibration frequency location of the addition points of the liquid coating, location of the addition points of the solid coating, order or sequence of the coating addition, pattern of spray of the nozzle for the liquid coating, droplet size of the liquid coating, and particle size of the solid.

Figure 2:
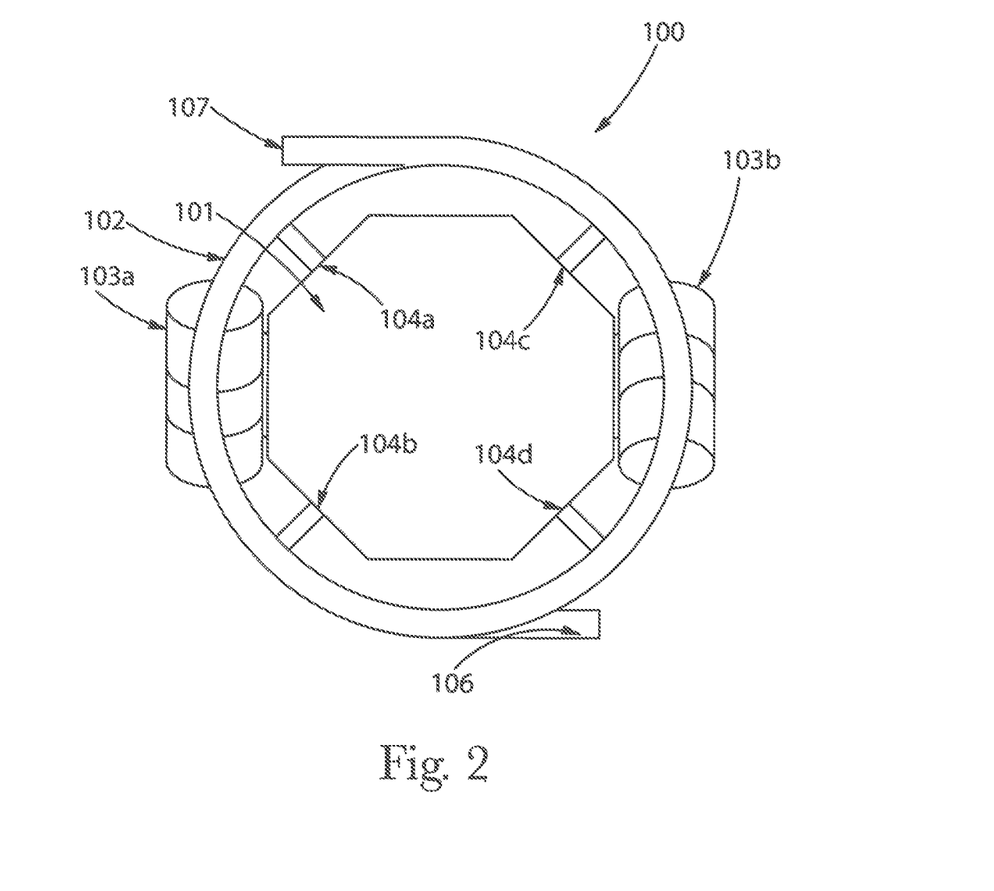
FIG. 2 is a top view of one embodiment of a spiral conveyor.

A side view of one embodiment of just one non-limiting example of a spiral elevator is shown in FIG. 1, and a top view of one embodiment of a spiral elevator is shown in FIG. 2. A pipe 102 is wound in a helix, or coil, around a central column 101 and mounted to the column by a set of supports 104a, 104b, 104c, and 104d. The central column 101 rests on a set of shock absorbers 105a, 105b, 105c, and 105d. Two electric motors 103a and 103b with rotating weights (not shown) are mounted on either side of the column 101. The motors 103a and 103b are mounted at an angle with respect to horizontal. A typical angle may be 45 degrees. The motors 103a and 103b are offset from each other by 90 degrees. The motors 103a and 103b impart a vertical vibration component and a horizontal vibration component to the column 101. The column 101, in turn, imparts these vibration components to the helical pipe. The magnitude of both the vertical and horizontal vibrations is determined by the frequency of the motor, the size, shape, and position of the weights, the power of the motor, and the angle of the motor relative to horizontal. Kibbles (not shown) are fed into the helical pipe at the product entrance (106). The vertical vibration of the pipe 102 causes the kibbles to bounce up and down within the pipe 102, thus fluidizing the kibbles. The horizontal vibration of the pipe 102 causes the kibbles to proceed up and through the pipe. The kibbles then exit the pipe at the product exit 107.

As shown in FIG. 1, pipe 102 provides the channel for the flow of materials, such as kibbles. While a pipe is shown, any shape and dimension of vibrating conveyor can be used. Thus, in one embodiment, the vibrating conveyor comprises a channel having an inlet and an outlet. The channel, as described, can be of several types of cross sections. In certain embodiments, the channel can have a substantially round cross-section. In certain embodiments, the channel can have a substantially rectangular cross-section. In certain embodiments, the channel can have a substantially rectangular cross-section with a dished bottom.

In one embodiment, the channel can have a particular diameter. In one embodiment, the diameter of the channel can be at least four times as large as the ESD of the food product, or kibble. In one embodiment in which a pipe is used for the channel, and in which a pipe can be considered a substantially round cross-section, the pipe can have a diameter of about 8 inches, or about 1 to about 20 inches, or about 5 to about 15 inches. However, any diameter of pipe can be used.

In one embodiment, the vibrating conveyor can have particular number of coils, as shown in FIG. 1. In one embodiment, the vibrating conveyor can have a single coil. In one embodiment, the vibrating conveyor can have more than one coil. In one embodiment, the vibrating conveyor can have two coils, or three coils or four coils or eight coils, or up to about 30 coils. Partial coils are also envisioned.

The vibrating conveyor can be made of stainless steel. In one embodiment, the vibrating conveyor can be made of 316 stainless, or 304 stainless, or 316L stainless. Other materials may be used.

Thus, the vibrating conveyor can be used to further process the cores. The core material, such as uncoated kibbles, may be introduced at one end of the conveyor. The vibration of the bed of the conveyor causes the kibbles to fluidize, and, at the same time, the kibbles move forward through the conveyor. The continuous flow of kibble into the conveyor and the continuous flow of the kibbles out of the conveyor are adjusted so that the flows are mass balanced and steady state, and the amount of kibble at any one time inside the mixer is approximately constant. A suitable vibrating conveyor may be obtained from Carrier Vibrating Equipment of Louisville, Ky., USA, and Carman Industries of Jeffersonville, Ind., USA.

The vibrating conveyor can be operated to adjust particular properties of the particles being transported through the vibrating conveyor, such as the kibbles disclosed herein. In one embodiment, the dimensionless acceleration number of the particles can be affected. In operation, the dimensionless acceleration number is the ratio of the upward acceleration of the particles due to the vibration of the bed of the conveyor divided by the downward acceleration due to gravity. The dimensionless acceleration number can be expressed as the product of the vibration frequency squared times the vertical amplitude of the vibration divided by the gravitational constant. Thus, the equation for the dimensionless acceleration number can be represented as follows: $\omega^2 a/g$, where "$\omega$" is the vibration frequency, "a" is the vertical amplitude of vibration, and "g" is the gravitational constant.

In one embodiment, the conveyor can be operated so that the dimensionless acceleration number can be greater than about 0.3. In one embodiment, the conveyor can be operated so that the dimensionless acceleration number can be greater than about 1. In one embodiment, the conveyor can be operated so that the dimensionless acceleration number can be between about 0.5 and about 2, or from about 0.5 to about 1.5, or from about 0.5 to about 5, or from about 1 to 4. Operating in these ranges can also help provide for integrity of the conveyor itself.

In one embodiment, the conveyor can be operated so that the average vertical amplitude of vibration can be greater than about 3 mm. In one embodiment, the conveyor is operated so that the average vertical amplitude of vibration can be between about 3 mm and about 20 mm, or between about 5 mm and about 20 mm, or about 7 mm to about 15 mm. Greater vertical amplitude of vibration causes the particles, or core materials: in the bottom layer of flow circulate upward into the flow of the coating material being applied to the cores. This circulation helps provide more even coating of the particles.

As used herein, bed depth is defined as the distance between the top of the bed of particles in the conveyor to the bottom of the bed. In the case of a vibrating conveyor using a trough type conveying device, the bottom of the bed would be measured at the deepest point in the trough. In one embodiment, the bed depth can be from about 0.5 cm to about 15 cm, or from about 3.5 cm to about 12 cm, or from about 5 cm to about 10 cm.

In one embodiment, as depth of the bed of particles flowing through the conveyor increases, the amplitude can increase as well to help provide more even coating of the particles. Thus, in one embodiment, the ratio of the vertical amplitude of vibration to the bed depth can be between about 0.01 to about 1. In one embodiment, the ratio of the average vertical amplitude of vibration to the bed depth can be between about 0.1 to about 0.5, or from about 0.1 to about 0.3, or about 0.2. Without being limited by theory, it is thought that maintaining this ratio can lead to better mixing and coating of the particles.

In one embodiment, the frequency of vibration should be from about 1 to about 100 Hz. In one embodiment, the frequency of vibration should be from about 1 to about 50 Hz, or from about 1 to about 20 Hz, or from about 1 to about 10 Hz or about 5 Hz., or about 5 to about 15 Hz or about 10 Hz.

In one embodiment, the vibrating conveyor can be operated such that the ratio of the amplitude of vertical vibration to the ESD of the food particle, or kibble, can be from about 0.5:1 to about 3:1, or from about 1:1 to about 2:1, or from about 1.5:1, such that the operation of the vibrating conveyor moves the kibble from the inlet to the outlet of the vibrating conveyor.

It is desirable that the flow of the core material through the vibrating conveyor be substantially plug flow. Plug flow is defined as the minimization of axial mixing. Axial mixing is defined as the tendency of an aliquot of core materials to spread away from one another in the direction of the mass flow of the core material. When flow of the core material is substantially plug flow, the core materials are in the vibrating conveyor for approximately the same amount of time. With increasing axial mixing, the times that the cores spend in the vibrating conveyor can vary somewhat, possibly resulting in more uneven coating from core particle to another. The amount of axial mixing in a vibrating conveyor can be calculated according to the method described in Levenspiel's "Chemical Reaction Engineering", $3^{rd}$ edition. The Peclet number is a measurement of the amount of axial mixing and degree of plug flow. The Peclet number is a dimensionless number that is the ratio of the bulk flow of the core material to the axial mixing along the length of the vibrating conveyor in the direction of core material flow. The larger the Peclet number, the better the plug flow. Higher Peclet numbers may result in more even coating of the core material. In one embodiment, the vibrating conveyor can be operated so that the Peclet number is greater than about 6. In one embodiment, the vibrating conveyor is operated so that the Peclet number is greater than about 100. In one embodiment, the vibrating conveyor is operated so that the Peclet number is greater than about 1000. In one embodiment, the vibrating conveyor is operated so that the Peclet number is greater than about 10000.

In one embodiment, the coating may be applied to the kibble over the vibrating kibbles in the conveyor. Thus, in one embodiment, the coating can be fed into the vibrating conveyor such that the kibble is coated with the coating as it moves from the inlet to the outlet. In one embodiment, the liquid binder may be sprayed onto the vibrating kibbles. In one embodiment, the liquid binder may be sprayed over the vibrating kibbles in one or more locations along the length of the conveyor. In one embodiment, the coating material may be applied to the kibble over the vibrating kibbles. In one embodiment, the coating material may be applied over the vibrating kibbles in one or more locations along the length of the conveyor. In one embodiment, the coating material may be introduced to the conveyor with kibble stream at the beginning of the conveyor.

Thus, in one embodiment, the vibrating conveyor can have openings, or ports. These openings, or ports, can be used to feed the coating into the vibrating conveyor. These openings can be present at any point along the vibrating conveyor. They can be spaced as appropriate to feed coatings into the conveyor. For example, in one embodiment, a first port can be positioned near the inlet to introduce a first coating, and then a second port can be positioned farther along the conveyor to introduce a second coating. Thus, any number of ports can be used, such as a first, a second, a third, a fourth, and so on. Any number of coatings can be fed into these ports, such as a first, a second, a third, a fourth, and so on. Additionally, these ports can be positioned at any location along the vibrating conveyor and can be spaced apart at any interval. In one embodiment, the ports can be about 180 degrees apart. The different ports may be used to apply multiple aliquots of the same coating material, or may be used to apply different coating materials. In some embodiments, two or more different, non-adjacent ports are used to apply aliquots of the same coating material, with a different coating material or materials applied at one or more interspersed ports.

In one embodiment, the spiral conveyor can be heated, or heat can be introduced inside of the vibrating conveyor for heat treatment of the kibbles. One such embodiment is disclosed herein with respect to microbe deactivation. In one embodiment, the vibrating conveyor can have a temperature profile. Thus, in one embodiment, different sections of the spiral conveyor can be under different temperatures, thus creating a temperature profile. Such a temperature profile can result in the kibble being under different temperatures as it flows through the vibrating conveyor. In one embodiment, steam can be injected or fed into the vibrating conveyor. Such injection can occur through the aforementioned ports. In other embodiments, the vibrating conveyor channels themselves can be heated. In one embodiment, the vibrating conveyor can be considered in sections, and the sections can be heated to different temperatures such that a first portion of the vibrating conveyor is at a first temperature and a second portion of the vibrating conveyor is at a second temperature. The temperatures can include temperatures for microbial control, as disclosed hereinafter. In other embodiments, the channel can be heated entirely. In other embodiments, jackets of steam or water can be used for heating, electrical tape can be used for heating, and current can be run through the pipe itself for heating.

In one embodiment, a vibrating conveyor having an enclosed trough or enclosed pipe can have the advantages of both completely containing and enclosing the core materials while at the same time preventing contamination from the outside. This setup can be an advantage with regard to cleaning and sanitization of the process.

In one embodiment, the average residence time of the core materials inside the coating unit, such as the vibrating conveyor disclosed herein, can be from about 10 to about 600 seconds. In one embodiment, the average residence time of the core materials inside the coating unit can be from about 30 to about 180 seconds. When the average residence times of the core materials in the coating unit are in this range, the core materials may be coated substantially evenly, while keeping the size of the equipment compact.

In one embodiment, the flow of core materials though the vibrating conveyor can be from about 10 to about 60,000 kg/hr. In one embodiment, the flow of core materials though the unit can be from about 1,000 to about 40,000 kg/hr.

In one embodiment, the core pellets may be routed to a hopper prior to entering the vibrating conveyor.

As described above, in one embodiment, the coating can comprise a protein component and a binder component. In one embodiment, the protein component and the binder component are mixed together into a single mixture or pre-mixed coating, prior to addition to the vibrating conveyor. In another embodiment, the protein component and the binder component are not mixed together into a single mixture prior to addition to the vibrating conveyor.

In one embodiment, the coating components, such as the protein component, fat component, binder component, and/or palatant component, and combinations and mixtures thereof, can be separately introduced into the vibrating conveyor at separate points along the vibrating conveyor.

In one embodiment, the core pellets and the coating component can be introduced into the vibrating conveyor at separate times but at substantially identical physical locations. In one embodiment, the core pellets and the coating can be introduced into the vibrating conveyor at the same time and substantially identical physical locations. In one embodiment, the core pellets and the coating can be introduced into the vibrating conveyor at separate times and at separate locations. In one embodiment, the core pellets and the coating can be introduced into the vibrating conveyor at the same time and separate locations.

In one embodiment, at least about 50% of the coating that is fed into the vibrating conveyor adheres to the food product. In another embodiment, at least about 60%, or at least about 70%, or at least about 80%, or at least about 90% of the coating material adheres to the food product.

In one embodiment, the coating process utilizing the spiral conveyor can have an average core pellet residence time of from 0 minutes to 20 minutes. In one embodiment, the core pellet residence time can be from about 0.2, 0.4, 0.5, or 0.75 minutes to about 1, 1.5, 2, 1.5, or 3 minutes.

If a water-based binder is used to apply the coating, or if the product has had steam applied after the coating step as described herein, it may be desirable to dry the product in one embodiment. Drying can be accomplished by any of the methods described herein, or any other suitable method. The exact conditions of the drying will depend on the type of dryer used, the amount of moisture, or water, removed, the temperature sensitivity of the applied coating, and the final moisture, or water, level of the product required. One skilled in the art would be able to adjust these factors appropriately to achieve the desired product. Additionally, drying can be performed in the vibrating conveyor where the coating took place. A stream of dry air, possibly at a temperature elevated above ambient, can be passed over the product at a sufficient rate to remove the amount of moisture, or water, required over the time period required. The dry air can be injected at any point along the conveyor. If desired, the wall of the conveyor can be heated. The air flow over the bed of particles can be kept below the speed where either the vertical or horizontal movement of the particles is altered by the flow of the air. The flow of the air can be concurrent or counter current with respect to the flow of the kibbles. The maximum allowable amount of air flow over the bed of particles without altering the movement of the particles can depend on the size, shape, and density of the particles.

Microbe Deactivation Steps

Additional embodiments of the present invention include a method of making a pet food including at least one heat treating step for microbe deactivation (kill), such as salmonella. The pet food can be in any form of the embodiments described herein. In one embodiment, a non-limiting example of which is a coated kibble that comprises a core and a coating as hereinabove described, two heat treating deactivation steps can be performed. The core can be formed through extruding, as described hereinabove. After extruding into a core, the core can be heat treated in a manner to sufficiently deactivate any salmonella present in the core. Subsequently, prior to, or contemporaneously, the coating can be formed and heat treated in a similar manner as that of the core to deactivate any salmonella present. The coated kibble can then be formed, as described hereinabove, by coating the core with the coating.

*Salmonella* deactivation generally requires the application of heat while the microbes are in a moist environment. Once completely dry, salmonella can become dormant and resist efforts using dry heat to deactivate them. In a moist environment, salmonella are more readily deactivated. For example, the application of heat at 80° C. for greater than about two minutes can effectively deactivate salmonella when in a moist environment. Application of temperatures higher than 80° C.

in moist environments results in correspondingly shorter times needed to deactivate the salmonella.

Superheated steam has been used effectively in many industries to deactivate *salmonella*. Superheated steam is defined as steam at a temperature greater than the boiling point of water for the existing pressure. Most industrial use of superheated steam utilizes pure or substantially pure steam. The non-steam component is usually air.

In one embodiment the salmonella deactivation step may be performed in a vibrating conveyor, such as a spiral elevator, as disclosed herein. In one embodiment, steam can be injected into the vibrating conveyor for microbe control. Steam can be injected into the coils of the vibrating conveyor at any point, and even through multiple points. Such injection can be through ports as disclosed herein.

In one embodiment, steam can be injected into the pipe on one side of a coil of the conveyor and can be extracted from the pipe at the other side of the coil by an exhaust manifold attached to the coil. In one embodiment, the channel, such as a pipe, can be heated to greater than about 100° C., or greater than about 110° C., or greater than about 125° C. to prevent condensation of steam inside the pipe. In one embodiment, the channel can be heated in sections. In another embodiment, the pipe can be heated entirely. In other embodiments, jackets of steam or water can be used for heating, electrical tape can be used for heating, and current can be run through the pipe itself for heating.

In an embodiment wherein steam is injected, once inside the pipe, the steam contacts and treats all of the fluidized kibbles such that they are free of microbes, such as salmonella.

The treated kibble can then exit the conveyor at the top and can be sent to a cooler, such as a vibrated fluidized bed cooler. The vibrated fluidized bed cooler can be an enclosed rectangular unit with a bed plate made of stainless steel perforated with sized holes, such as 2 mm holes. Over this bed plate can be a layer of porous polyester cloth. An air manifold can exist underneath the bed plate. In one embodiment, a forced air blower can blow air into the air manifold, which then can travel up through the bed plate and cloth, then up through any product on the bed. The air can be exhausted through the top of the cooler and can be exhausted. The bed can be vibrated by piston motors with eccentric weights, which cause the bed to vibrate up-and-down and side-to-side. The up-and-down motion fluidizes the kibbles in the bed, and the side-to-side motion causes the kibbles to move through the bed, lengthwise, from one end to the other. The kibbles exit the cooler at the opposite side from where they entered, and fall into a clean bag for collection. This entire process provides one embodiment for coating kibbles and deactivating any salmonella present on the surface of the kibbles or the coating.

It has additionally been found that salmonella can be effectively deactivated with humid hot air, at ambient pressure, at temperatures greater than about 80° C. One advantage of this method is that humid hot air can be injected into the vibrating conveyor at ambient pressure conditions during or after the coating step. The temperature of the humid hot air can be greater than 80° C. Higher temperatures can result in shorter times of application of humid hot air to effectively deactivate salmonella. The relative humidity of the air can be greater than 50% and can even be greater than 90%. Relative humidity is defined as the ratio of the partial pressure of water vapor in the air to the saturated vapor pressure of water at a given temperature.

An additional method of heat treating, or deactivating, salmonella of the pet food in accordance with one embodiment of the present invention is disclosed in RU 2251364.

Sections

In one embodiment, the vibrating conveyor can be made up of sections, such as a first section, a second section, a third section, and so on. The sections can be used to perform different functions of the pet food making process. For example, in one embodiment, the vibrating conveyor can be made up of a first section, a second section, and a third section. In such an embodiment, the first, second, and third sections can be comprised of any number of coils. The first section can be near the inlet and can be used to coat the kibbles. The second section can be after the second section and can be used to dry the kibbles and thus may have air and/or heat applied for drying. The third section can be after the second section and can be used to sanitize, or microbially control, the kibbles. Additional sections are envisioned. In one embodiment, a second coating section can be included. Such a second coating section can be used to coat sensitive or active ingredients, such as Probiotics, as disclosed herein. Thus, such a second coating section can be arranged after the sanitization section such that the heat of the sanitization section does not impact the activity of the active ingredient.

EXAMPLES

Example I

A large bag of uncoated pet food kibbles is loaded onto the platform above a feed hopper for a vibrating spiral elevator. The kibbles are about 10 mm in diameter. The vibration amplitude of the spiral elevator is about 5 mm, and the vibration frequency is about 5 Hz. The feed hopper can hold about 200 kg of uncoated kibbles, and the kibbles are transferred by gravity from the bag to the hopper from time to time to keep the hopper full. The hopper is mounted on load cells with a screw conveyor feeder at the bottom. A debridger in the hopper rotates around the hopper about once a minute to keep the kibbles evenly distributed in the hopper. The hopper and screw conveyor act as a loss-in-weight feeder to the vibrating spiral elevator. The feed system and the vibrating spiral elevator are operated from a computer screen using a visual software interface. The vibrating spiral elevator unit consists of 8 coils of 84 mm diameter stainless steel pipe wrapped around a central pillar. The central pillar is vibrated by two piston motors with eccentric weights at the bottom of the unit. The up-and-down vibration causes the kibbles in the pipe to bounce up-and-down, thus fluidizing the kibbles. The back-and-forth vibration causes the kibbles to move through the tube. The kibbles are fed into the elevator through a pipe at the bottom, and the vibration causes the particles to move upward through the pipe. The treated product exits at the top of the elevator. The coiled pipe is insulated with stone fiber insulation. Each coil of the pipe has two inlet ports, 180 degrees apart. Solid powder coating is injected on one side of the coil through a port, and liquid coating is sprayed in the other side of the coil through a port. The treated product exits the elevator unit at the top. The particles exiting the spiral elevator are substantially evenly coated with both the liquid and the solid powder.

Example II

The procedure described in the previous example is repeated, except that steam is injected into the top two coils through a port to heat the kibbles in a moist environment to kill microbes including salmonella. The steam is injected on one side of the coil through a port and is extracted at the other side of the coil by an exhaust manifold attached to the coil.

The pipe is heated to about 125° C. to prevent condensation of steam inside the pipe. Once inside the pipe, the steam contacts and treats all of the "fluidized" kibbles. The treated kibble product exits the unit at the top, and travels via pipe to a vibrated fluidized bed cooler. The vibrated fluidized bed cooler is an enclosed rectangular unit with a bed plate made of stainless steel perforated with 2 mm holes. Over this bed plate is a layer of porous polyester cloth (pore size is 63 microns). Underneath the bed plate is an air manifold. A forced air blower blows air into the air manifold, which then travels up through the bed plate and cloth, then up through any product on the bed. The air is exhausted through the top of the cooler and is exhausted outside the building using an exhaust fan. The bed is vibrated by two piston motors with eccentric weights, which cause the bed to vibrate up-and-down and side-to-side. The up-and-down motion fluidizes the kibbles in the bed, and the side-to-side motion causes the kibbles to move through the bed, length-wise, from one end to the other. The kibbles exit the cooler at the opposite side from where they entered, and fall into a clean bag for collection. This process coats the kibbles and deactivates any salmonella present on the surface of the kibbles or the coating.

Example III

A vibrating spiral elevator shown in FIGS. 1 and 2 consists of about 6 meters of stainless steel pipe about 89 mm internal diameter that is wound into a helix about 0.92 meters in diameter around a central cylinder. The pipe helix has four loops. The incline of the pipe helix is about 3 degrees from horizontal. There are four ingredient addition ports on each loop spaced 90 degrees apart. A central cylinder inside the pipe helix and attached to the pipe helix is mounted on rubber suspension supports that allows for a limited amount of horizontal and vertical movement of the cyclinder when force is applied to it. The central cylinder is vibrated using two motors with off-balance weights on either side of the cylinder. The motors are set at 45 degrees from horizontal and are offset from each other by 90 degrees. The motors with the off balance weights are synchronized with each other so that both horizontal and vertical acceleration is imparted to the central cyclinder. This causes the cylinder to vibrate up-and-down and twist slightly back-and-forth horizontally, which in turn causes the helical pipe attached to it do the same. The motors are run at about 600 RPM, which imparts a horizontal acceleration to the cylinder and the pipe of about 1.5 times gravity and a vertical acceleration of about 3.2 times gravity.

Dog food kibbles are prepared by milling, batching, conditioning, extrusion, and drying. The uncoated kibbles are fed to the vibrating spiral elevator at the bottom of the helix at about 10 kg/min. The horizontal acceleration of the helix causes the kibbles to move through the pipe from the bottom of the helix to the top. The vertical acceleration causes the kibbles to be slightly fluidized as they move through the pipe. The vertical amplitude of the kibble motion is about 5 mm. The dimensionless acceleration number is about 0.5.

At the entrance of the kibble flow to the vibrating spiral elevator, about 1 kg of white coated kibbles are added to the 10 kg/min flow of brown kibbles to act as a tracer. Samples of kibbles are collected at the outlet of the spiral elevator every 5 seconds, and the percents of white kibbles and brown kibbles in each sample are determined. From these samples, the Peclet number is calculated according to the method described in Levenspiel's "Chemical Reaction Engineering", 3rd edition. For this experiment the Peclet number is calculated to be about 1870.

Poultry fat is sprayed onto the surface of the kibbles using two air-atomized spray valves, one located in a port in the lowest loop of the pipe helix, and another located in a port on the next loop up from the lowest loop. The poultry fat is applied at a rate of about 3% by weight of the uncoated kibbles. Liquid flavoring is sprayed onto the surface of the kibbles using one air-atomized spray valve located in a port in the third loop from the bottom of the pipe helix. The liquid flavoring is applied at a rate of about 2% by weight of the uncoated kibbles. The coated product is collected at the outlet of the pipe at the top of the helix. The coated product is packaged in plastic lined bags and saved for later use.

Example IV

A product similar to the product in Example III is made except that the coating is done in a dual axle continuous ribbon mixer. The type of kibbles, the flow rate of the kibbles, and amounts of poultry fat and liquid flavoring applied to the surface of the kibbles is the same as Example III. The coated product is packaged in plastic lined bags and saved for later use.

Examples V

The products from Examples III and IV are placed into a consumer study. About 100 consumers were given bags of dog food from Example III (coated with the vibrating spiral elevator) and Example IV (coated with the ribbon mixer). The consumers feed both test products to their dogs over a 2 week period. At the end of the two week feeding study the consumers fill out questionairres and give numerical scores to various attributes of the feed experience. The questionairres are then collected and the scores are tabulated and statistically analyzed. The product coated with the vibrating spiral elevator has statistically significant better scores for dog enjoyment of the food than the product coated with the ribbon mixer. Without wishing to be bound by theory, it is believed that the vibrating spiral elevator produces a more uniform coating of palatant on the kibbles, making the taste of the kibbles more consistently appealing to the dog.

Example VI

About 10% by weight (of the uncoated kibble) of protein meal is coated on kibbles using about 5% poultry fat in the vibrating spiral elevator described in Example III. The protein meal has an average particle size of about 140 microns. Three experiments are conducted. The first experiment uses the fat as a binder for sticking the protein meal on the surface of the kibble. The second experiment was the same as the first except that about 2.4% (by weight of the fat) of polysorbate 80 is added to the fat prior to spraying it on the kibbles. The third experiment is the same as the first except that about 3.6% of polysorbate 80 was added to the fat prior to spraying it on the kibbles. The product from the coating experiments were collected and placed in a sieve shaker to shake off any excess coating that is not stick onto the kibbles. The results of the experiments are shown in the table below. These results show that a small amount of polysorbate 80 added to the chicken fat reduces the amount of protein coating that does not adhere to the kibbles.

|  | % PS 80 in fat | Grams of coating that did not stick to the kibbles | Percent of coating that did not stick to the kibbles |
|---|---|---|---|
| Experiment 1 | 0.0% | 47.24 | 4.8% |
| Experiment 2 | 2.4% | 27.05 | 2.7% |
| Experiment 3 | 3.6% | 18.22 | 1.8% |

The contact angles of three liquids—diiodomethane, formamide, and water—are measured using a goniometer for kibbles from Experiment 1 (no polysorbate 80 in the fat), and kibbles from experiment 3 (3.6% polysorbate 80 in the fat). From these contact angle measurements, the polar and nonpolar components of the surface energies are caculated as described in Fowkes, F. M.: Industrial and Engineering Chemistry, vol. 56, number 12, p. 40 (1964). The table below shows that adding polysorbate 80 reduces the surface energy of the final product.

|  | Nonpolar surface energy (millijoules/m2) | Polar surface energy (millijoules/m2) |
|---|---|---|
| Kibbles from Experiment 1 | 24.19 | 5.22 |
| Kibbles from Experiment 3 | 23.84 | 1.75 |

Without being restricted by theory, it is believed that the reason polysorbate 80 reduces the surface energies is because the OH groups in the polysorbate side on the molecule hydrogen bond with the carbohydrates and proteins on the kibble surface, while the fatty chain on the polysorbate molecule interacts with the fat and possibly the protein meal as well (the protein meal is about 15% fat).

Methods

*Salmonella* Detection

Detecting whether *salmonella* has been sufficiently deactivated can be performed by many methods, one of which can be the following. A BAX System PCR assay is used with automated detection, and the following steps are performed.

The sample is prepared by weighing 25 grams of the sample to be tested into a sterile container. Add 225 ml of sterile buffered peptone water (BPW) to the sample. Incubate the sample at 35-37° C. for at least 16 hours. Next, prepare a 1:50 dilution by transferring 10 µl of the sample to a cluster tube containing 500 µl of Brain Heart Infusion (BHI). Incubate the tube at 35-37° C. for three hours. Then, warm up the heating blocks. Record the order samples as prepared on sample tracking sheet, in addition to the BAX system Kit Lot Number. Enter sample IDs into the BAX System's software, following instructions in user guide. Click on the run full process icon to initiate thermocycler. After the three-hour incubation period in BHI, transfer 5 µl of the re-grown samples to cluster tubes containing 200 µl of lysis reagent (150 µl into 12 ml lysis buffer). Heat lysis tubes 20 minutes at 37° C. Heat lysis tubes 10 minutes at 95° C. Cool lysis tubes 5 minutes in lysate cooling block assembly. Arrange the appropriate number of PCR tubes in a PCR tube holder on the cooling block assembly. Loosen the caps with the decapping tool but leave in place until ready to hydrate the tablets. Transfer 50 µl of lysate to PCR tubes. Cap tubes with flat optical caps in order to detect fluorescent signal. Take the entire cooling block to the thermocycler/detector. Follow the screen prompts as to when the thermocycler/detector is ready to be loaded. Open the door to the thermocycler/detector, slide the drawer out, place the PCR tubes into the heating block (making sure the tubes are seated in the wells securely), shut the drawer, lower the door, and then click NEXT. The thermocycler amplifies DNA, generating a fluorescent signal, which is automatically analyzed to determine results.

The results are provided next. When the thermocycler/detector is complete, the screen prompts to open the door, remove the samples, close the door, and then click NEXT. Click the FINISH button to review the results. The screen displays a window with a modified rack view, showing different colors in the wells, with a symbol in the center to illustrate the results. Green (−) symbolizes a negative for target organism (salmonella), a red (+) symbolizes a positive for target organism (salmonella), and a Yellow with a (?) symbolizes an indeterminate result. The graphs for negative results should be viewed to check for the large control peak around 75-80. The graphs for positive results should be interpreted using Qualicon's basis for interpretation. If a Yellow (?) result arises, retest from (?) sample lysate and BHI sample lysate. Follow steps above to complete test.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process to coat a food product, the process comprising:
   a. providing a food product;
   b. providing a vibrating conveyor wherein the vibrating conveyor comprises an enclosed channel and wherein the vibrating conveyor has an inlet and an outlet;
   c. feeding the food product into the inlet of the vibrating conveyor;
   d. operating the vibrating conveyor at a Peclet number of greater than about 6, at a dimensionless acceleration number of greater than about 0.3, and a vertical amplitude of vibration of greater than about 3 mm;
   e. feeding a coating material into the vibrating conveyor such that the food product is coated with the coating material as it moves from the inlet to the outlet.

2. The process of claim 1, wherein the vibrating conveyor comprises a spiral.

3. The process of claim 1, wherein the vibrating conveyor comprises at least one opening along its length.

4. The process of claim 1, wherein the coating material is fed through the opening.

5. The process of claim 1, wherein the vibrating conveyor comprises two or more openings along its length.

6. The process of claim 5, wherein two or more different coating materials are fed into the vibrating conveyor, each through at least one of the two or more openings.

7. The process of claim 5, wherein superheated steam is fed into the vibrating conveyor through one of the two or more openings.

8. The process of claim 7, wherein the food product is exposed to the superheated steam under conditions sufficient to deactivate a microbe.

9. The process of claim 8, wherein the microbe is salmonella.

10. The process of claim 1, wherein the enclosed channel has a substantially round cross section.

11. A process for coating a particulate product, the process comprising:
   a. introducing the particulate product at an inlet of a vibrating conveyor;
   b. vibrating the conveyor to induce both vertical movement within and horizontal movement through the conveyor with a Peclet number greater than about 6; and
   c. feeding a coating material into the vibrating conveyor such that the particulate product is coated with the coating material as it moves from the inlet to an outlet of the vibrating conveyor.

12. The process of claim 11, wherein the vibrating conveyor has a dimensionless acceleration greater than about 0.3.

13. The process of claim 11, wherein the vibrating conveyor has an average vertical amplitude of vibration greater than about 3 mm.

14. The process of claim 11, wherein the particulate product moves along a bed within the vibrating conveyor, the bed having a bed depth, and the ratio of vertical amplitude to bed depth is between about 0.1 to about 0.5.

15. The process of claim 11, wherein the frequency of vibration is from about 1 to about 100 Hz.

16. The process of claim 11, wherein the vibrating conveyor has a Peclet number greater than about 100.

17. The process of claim 11, further comprising introducing a stream of dry air into the vibrating conveyor.

18. The process of claim 17, wherein the dry air is heated relative to ambient temperature.

19. The process of claim 11, wherein the particulate product is a pet food kibble.

20. The process of claim 19, further comprising introducing a stream of superheated steam into the vibrating conveyor under conditions sufficient to deactivate a microbe.

\* \* \* \* \*